Sept. 26, 1950     C. J. OLIVER ET AL     2,523,513
FASTENING MEANS FOR TELESCOPING TUBULAR MEMBERS
Filed Feb. 25, 1949     2 Sheets-Sheet 2
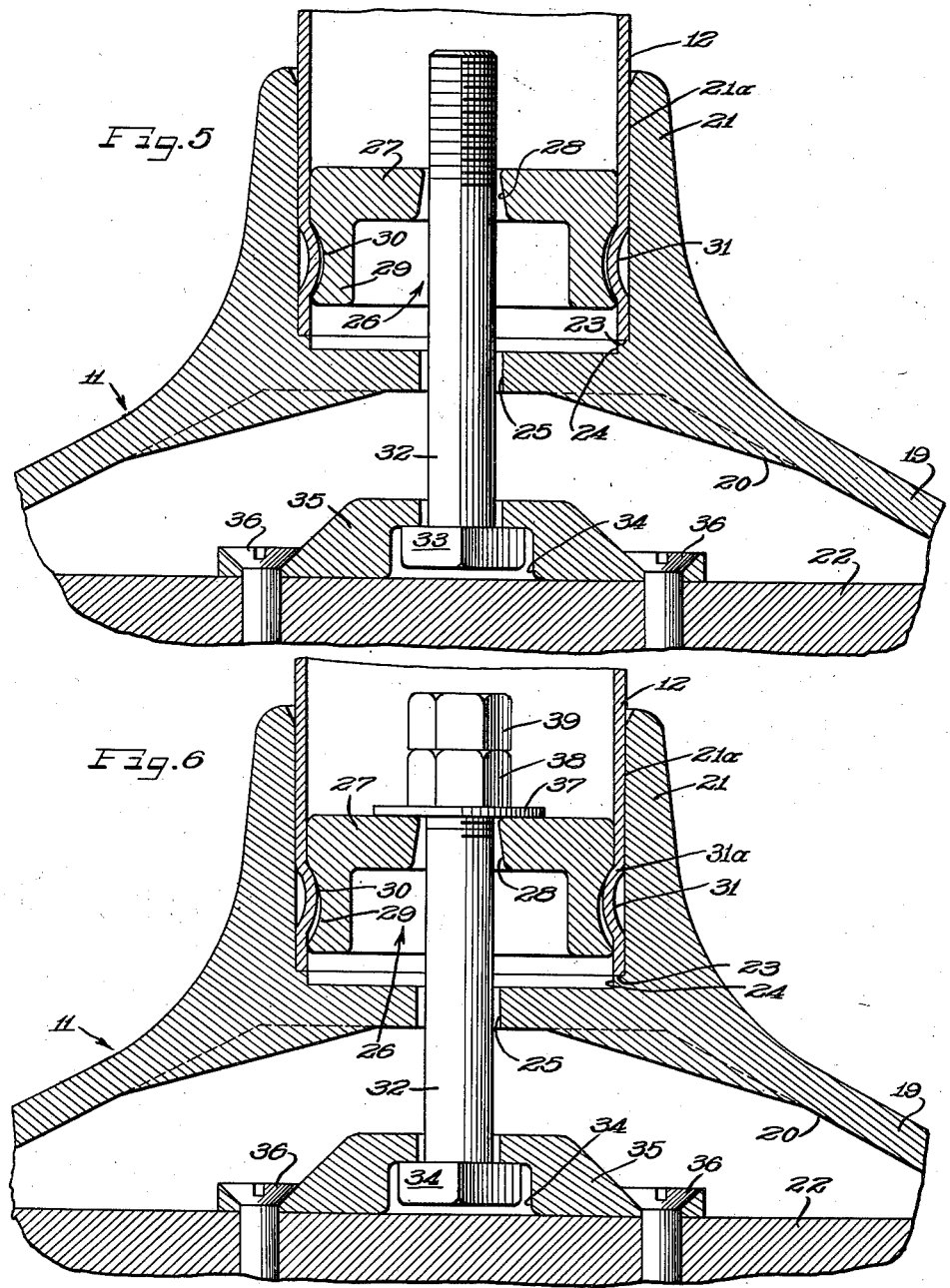
Inventors
Conrad J. Oliver
Joseph Kupski
By The Firm of Charles W. Hill Attys Patented Sept. 26, 1950

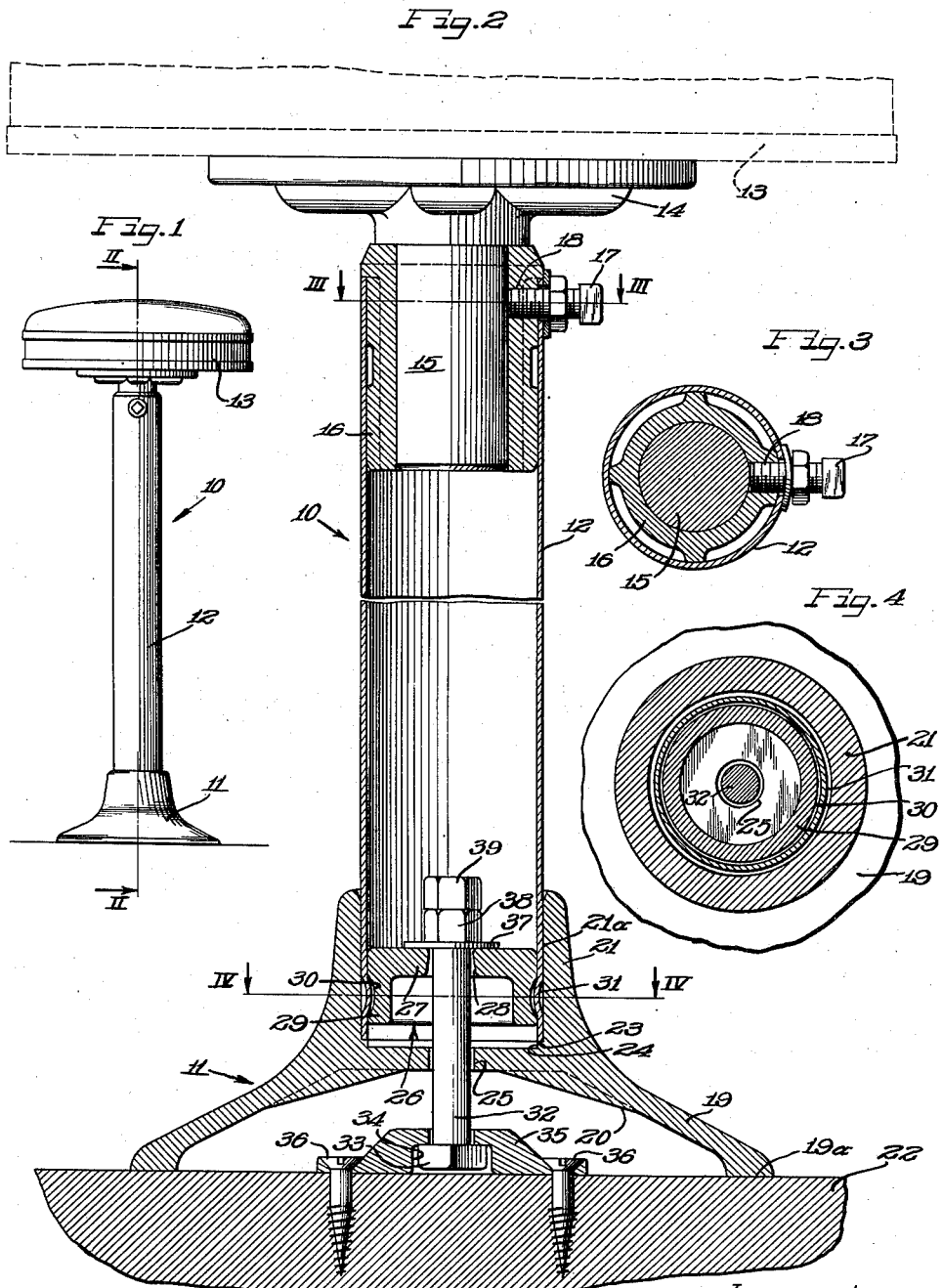

2,523,513

UNITED STATES PATENT OFFICE 2,523,513

FASTENING MEANS FOR TELESCOPING TUBULAR MEMBERS

Conrad J. Oliver, Waukegan, and Joseph Kupski, North Chicago, Ill., assignors to The Chicago Hardware Foundry Company, North Chicago, Ill., a corporation of Illinois Application February 25, 1949, Serial No. 78,344

10 Claims. (Cl. 155—134)

The present invention relates to fastening means for telescoping tubular members and more particularly to means disposed wholly within a plurality of telescoping tubular members for maintaining the members in nested relation.

The present invention provides an inexpensive, easily manufactured, and readily adjustable means for securing a pair of telescoping tubular members together in nested relation without the employment of securing means extending externally of the nested members. Tubing of a specified size, as commercially available, may vary in internal and external diameter and in wall thickness throughout a relatively wide range. This dimensional variance makes impossible the accurate fitting of nested tubular members, particularly where one of the members is to be employed in a load-bearing capacity. Accordingly, it has previously been necessary to machine one or both of said members before an accurate, frictional, telescopic fit could be obtained.

The disadvantages residing in the necessity of such machining are well illustrated in the case of the manufacture of stools for soda fountains, counters, and the like in which a tubular post is fitted within a cylindrical recess formed in a base structure to support a seat in spaced relation to the base. Prior to the present invention, it has been necessary in securing the tubular post in position within the base to machine each piece of tubing to fit the machined base recess within which it is to be fitted so that a snug fit may be obtained to eliminate the possibility of relative movement between the tube and the base. The additional manufacturing expense entailed in the machining of each piece of tubing will be evident.

More particularly, the present invention relates to means adapted to be wholly disposed within a plurality of telescoping tubular members to maintain the members in nested relation. In accordance with the present invention, a wedge plug is provided to be inserted within the inside of the inner telescoping tubular member, the plug being dimensioned to fit snugly within the innermost tube. The innermost tubular member itself is provided with an indentation, or preferably a peripheral groove, extending inwardly toward the wedge plug, and the wedge plug itself may be suitably provided with a recessed portion for receiving the indentation formed in the innermost groove. We desire to form the wedge plug as a generally cylindrical member having a peripheral groove adapted to receive the peripheral groove of the innermost tubular member, the wedge plug having sharpened annular edges defining the edges of the peripheral groove.

By the use of the wedge plug as hereinbefore described, it is only necessary to effect movement of the plug relative to the innermost tubular member with the sharpened annular groove edge biting into the grooved portion of the tube to force the same outwardly into engagement with the tubular member surrounding the innermost tubular member. Thus, the sharpened edge of the wedge plug actually effects a deformation of the innermost tubular member, forcing portions of this member into extended surface engagement with the outer tubular member to maintain the nested tubular members in fixed position.

The present invention is particularly applicable for use with a stool having a thin-walled post secured to a base by the fastening means above described so that the post may support a seat in spaced relation to the base. The means for effecting movement of the wedge plug relative to the tubular post may readily take the form of a bolt and nut, which at the same time serve to anchor the base to a supporting surface.

It is, therefore, an important object of the present invention to provide an improved, readily employed, inexpensive fastening means for securing telescoping tubular members in nested relation, the fastening means being entirely disposed within the nested tubular members and serving to peripherally deform one of the tubular members into extended surface contact with an adjacent tubular member.

Another important object of the present invention is to provide fastening means for securing telescoping tubular members in nested relation by deformation of the innermost of the nested tubes into peripheral surface contact with the outer tube by the use of a wedge plug fitting snugly within the innermost tubular member.

It is a further important object of the present invention to provide an improved stool, including a base having a cylindrical recess formed therein, a supporting tubular post seated in the recess and a wedge plug for maintaining the post within the base recess, the wedge plug having an annular seating face engaging a recessed portion of the post, and means for effecting movement of the wedge plug relative to the post to effect peripheral deformation of the post into contact with the base.

Other and further important objects of this invention will be apparent from the disclosures in the specification and the accompanying drawings.

On the drawings:

Figure 1 is a side elevational view of a stool of the present invention;

Figure 2 is an enlarged, broken sectional view, with parts shown in elevation, taken along the plane II—II of Figure 1;

Figure 3 is a sectional view, with parts shown in elevation, taken along the plane III—III of Figure 2;

Figure 4 is a view, with parts shown in elevation taken along the plane IV—IV of Figure 2;

Figure 5 is a fragmentary, enlarged view similar to Figure 2 illustrating the position of the fastening means during assembly of the stool; and Figure 6 is a fragmentary, enlarged view similar to Figure 5 illustrating the final assemblies and tightening of the fastening means.

As shown on the drawings:

In Figures 1 and 2, reference numeral 10 refers generally to a stool of the present invention comprising a base 11, a thin-walled tubular post 12 secured to base 11, and a seat 13 rotatably carried by post 12.

As more particularly shown in Figure 2, seat 13 is secured to post 12 by means of a tripod 14 having a cylindrical depending shank 15 received by a tripod bushing 16 telescopically mounted in one open end of tubular post 12. A set screw 17 is threadedly received by a threaded aperture 18 extending radially of tripod bushing 16 for securing the seat 13 against rotation by engagement with boss 15 desired.

Base 11 is provided with a lower flared, circular portion 19 having an interior bottom recess 20 formed therein to define an annular, peripheral, load-bearing surface 19a for contacting a supporting surface, such as a floor 22. Base 11 is provided with an upstanding central, generally cylindrical embossment 21 defining a central, cylindrical recess 21a terminating in a lower shoulder 23 defined by an additional bore 24 of smaller diameter than recess 23 and concentric therewith. A central cylindrical aperture 25 provides communication from bottom recess 20 to the upper recess 21a.

The tubular post 12 is secured to the base 11 by the fastening means of the present invention including a generally cylindrical, cupped wedge plug 26 having an upper portion 27 apertured as at 28 in axial alignment with recess 21a and aperture 25 hereinbefore described. The plug 26 is also provided with depending cylindrical side walls 29 provided with a peripheral recess or groove 30.

The lower portion of the tubular post 12 is of such size as to fit more or less snugly within recess 21a and is provided with a peripheral recess 31 of substantially the same size as the groove 30 of plug 27. The grooved portion 31 of post 12 extends into groove 30 of the plug 27 and serves to maintain the plug 27 in position within the lower portion of tubular post 12 as shown in Figure 2.

A bolt 32 is employed to maintain the base 11 in position upon supporting surface 22 and also to maintain the post 12 in position within recess 21a. Head 33 of bolts 32 fits within a cylindrical recess 34 formed in a supporting plate 35 of generally circular configuration which is secured to supporting surface 22 by screws 36. The shank of bolt 32 extends upwardly from a plate 35 through the registering apertures 25 of the base 11 and through the aperture 28 of the plug 26. A washer 37 is adapted to overlie the upper surface of portion 27 of plug 26, and a pair of nuts 38 and 39 are threaded into the shank of bolt 32 to urge the washer 37 into contact with the plug 27.

The assembly of the stool of Figure 2 is as follows: The plate 35 is secured to the supporting surface 22 by means of screws 36 with the bolt head 33 being positioned in recess 34 and the bolt shank extending upwardly therebeyond. Base 11 is next fitted over plate 35 with the bolt shank passing through the aperture 25 upwardly into the recess 21a. The plug 26 is inserted within the lower end of post 12 and held therein while the post 12 is rolled, or otherwise deformed, to form groove 31 extending into recess 30 of plug 26. The plug recess 30 thus receives the wall of groove 31 of post 12, the recess and groove being in substantial alignment, as illustrated in Figures 2 and 5. The assembled plug and post are next inserted in recess 22 so that the shank of bolt 32 extends upwardly through central aperture 28 of plug 26. The washer 37 and nuts 38 and 39 are next placed on bolt 32 and tightened by means of a long-shanked socket wrench inserted through the tubular post 12 from the open upper end, and the bolts are tightened until the sharpened edge of recess 30 formed in plug 26 contacts groove 31 extending into the groove 30 formed in plug 27. The recessed portion 30 of plug 26 and the groove 31 of post 12 are thus moved out of alignment.

Upon contact between that portion of the plug 26 immediately adjacent the groove 30 and the grooved portion 31 of post 12, the metal of the grooved portion of the tube 12 will be confined beneath the upper plug edge, and the tube 12 will be forced outwardly into tight gripping surface engagement with the walls of recess 21a. In this manner, the wall of groove 31 will be deformed radially outwardly by the tightening of nuts 38 and 39 and the resulting downward movement of plug 27 within the tube 12. This deformation of the groove wall is shown in Figures 5 and 6, in which it may be seen that portion 31a of the wall of groove 31 is forced radially outwardly into tight gripping contact with the interior peripheral surface of recess 21a. Thus, the tubular post 12 will be tightly positioned within base 11 and maintained in this position by means of bolt 32 and nuts 38 and 39, the bolt 32 also serving to secure the entire stool to the supporting surface 22.

Following the securing of the post within the base, the seat shank 15 is inserted within bushing 16 of post 12 and the assembled stool is ready for use.

It will, of course, be understood that various details of construction may be varied through a wide range without departing from the principles of this invention, and it is, therefore, not the purpose to limit the patent granted hereon otherwise than necessitated by the scope of the appended claims.

We claim as our invention:

1. Fastening means for securing in fixed nested relation a pair of telescoping members, the inner of which has a peripheral groove formed therein, comprising a wedge plug of such configuration as to fit snugly within said inner member and having a recessed portion receiving the wall of said peripheral groove; and means for effecting relative movement between said plug and said inner member to bring said recessed portion out of alignment with said groove and cause the wall of said groove to be deformed outwardly into tight gripping engagement with said outer member to secure said members against relative movement.

2. Fastening means for securing in fixed nested relation a pair of telescoping members, the inner of which has a peripheral groove formed therein adjacent one end thereof, comprising a cylindrical wedge plug of substantially the same exterior diameter as the interior diameter of said inner member and adapted to be inserted in said one end thereof, said wedge plug having a recessed portion in initial alignment with the wall of said peripheral groove, and bolt means operable against said wedge plug for effecting movement of said plug relative to said telescoping members, forcing said recessed portion of said plug out of alignment with said peripheral groove of said inner member, and causing the wall of said groove to be deformed outwardly into tight gripping engagement with said outer member to secure said members against relative movement.

3. Fastening means for securing telescoping members in fixed nested relation, the inner of said telescoping members having a peripheral groove formed therein, comprising a cupped wedge plug fitting snugly within said inner telescoping member, said plug having a peripheral recess formed therein for loosely receiving the peripheral groove of said inner member, and bolt means extending into said inner telescoping member and contacting said wedge plug for urging said wedge plug out of alignment with said portion of said inner telescoping member, thus causing radial deformation of the wall of said groove into tight gripping engagement with said outer member to secure said members against relative movement.

4. In a stool, a base having a cylindrical recess formed therein, a seat-supporting tubular post seated in said recess and initially having a peripheral groove formed in that portion extending into said recess, a wedge plug disposed within the grooved portion of said post and having a generally conforming peripheral groove for alignment with said first groove, and means for urging said plug axially of said post to displace the material of said post outwardly into tight gripping engagement with said base.

5. In a stool, a base having an upper cylindrical recess formed therein a seat-supporting tubular post for fitting into said recess having a peripheral groove formed in that portion adapted to fit into said recess, a cylindrical wedge plug for disposition within the grooved portion of said post and having a peripheral groove formed therein adapted to be initially aligned with the groove in said post to receive the wall of said post groove, and means for urging said plug axially of said post to move said grooves out of alignment and force the wall of said post groove outwardly into tight gripping engagement with the wall of said base recess.

6. In a stool, a base having a cylindrical recess formed therein, a seat-supporting post having a tubular end for insertion into said recess and having a peripheral groove in said end, a wedge plug for disposition within said post end having a peripheral groove for receiving the wall of the peripheral groove of said post, and fastening means for drawing said plug into said recess whereby, upon tightening said fastening means, said plug is caused to deform said groove wall radially outwardly into tight gripping contact with the wall of said recess to fixedly position said post within said recess.

7. A stool comprising a base having a cylindrical recess formed therein, a seat-supporting tubular post seated in said recess and having a peripheral groove formed in that portion extending into said recess, and means deforming a portion of the groove outwardly into tightly gripping surface engagement with walls of said recess to fixedly secure said post to said base.

8. A stool comprising a base having a cylindrical recess formed therein, a thin-walled seat-supporting tubular post seated in said recess and having a recessed wall portion defining a peripheral groove formed in that portion of said post extending into said recess, and means tightly engaging the wall of said groove to deform the wall radially outwardly into tightly gripping surface engagement with the walls of said base recess to fixedly secure said post therein.

9. A stool comprising a base having a cylindrical recess formed therein, a thin-walled seat-supporting tubular post seated in said recess, bolt means securing said stool to a supporting surface and extending into said recess, and means urged by said bolt means into contact with that portion of said post seated in said recess to deform said post outwardly into tightly gripping surface engagement with walls of said base recess to fixedly secure said post therein.

10. A stool comprising a base having a cylindrical recess formed therein, a thin-walled seat-supporting tubular post having a recessed wall portion extending into said recess, bolt means securing said stool to a supporting surface and extending into said recess and a wedge plug forced by said bolt means into biting engagement with said recessed wall portion of said post, the recessed wall portion of said post being thus deformed into tightly gripping surface engagement with adjacent wall surfaces of said recess to fixedly secure said post to said recess.

CONRAD J. OLIVER.
JOSEPH KUPSKI.

REFERENCES CITED

The following references are of record in the file of this patent:

UNITED STATES PATENTS

| Number | Name | Date |
| --- | --- | --- |
| 461,238 | Cox | Oct. 13, 1891 |
| 842,528 | Danver | Jan. 29, 1907 |
| 2,329,697 | Davies | Sept. 21, 1943 |
| 2,331,488 | Madsen | Oct. 12, 1943 |